Nov. 13, 1962   R. W. HANZEL   3,064,112
COOKING VESSEL AND METHOD OF MAKING THE SAME
Filed March 25, 1958

INVENTOR.
Richard W. Hanzel
BY George R. Clark
Attorney

United States Patent Office 3,064,112
Patented Nov. 13, 1962

3,064,112
COOKING VESSEL AND METHOD OF MAKING THE SAME
Richard W. Hanzel, La Grange Park, Ill., assignor to Sunbeam Corporation, Chicago, Ill., a corporation of Illinois
Filed Mar. 25, 1958, Ser. No. 723,893
6 Claims. (Cl. 219—44)

The present invention relates to an improved cooking vessel and also to an improved method of making the same.

The trend in cooking vessels has changed radically within the last few years. The beginning of this trend occurred with the development of a completely automatic, self-contained cooking vessel immersible in liquid for cleaning purposes, disclosed in Jepson Patent No. 2,744,995, granted May 8, 1956, and assigned to the same assignee as the instant application. Since that time numerous manufacturers have placed cooking vessels of various types and designs on the market, the attempt always being to provide a cooking vessel which is self-contained and yet which may readily be cleaned by immersing in cleaning liquids. It will be appreciated that a cooking vessel, such, for example, as a frying pan, must be of a design so that it can readily be cleaned, and this is true of saucepans and other commonly employed cooking vessels. Moreover, such cleaning cannot be accomplished only by exposing the interior of the vessel to a cleaning liquid. The housewife today will not be satisfied with a cooking vessel limited in this manner.

The problem of manufacturing such cooking vessels so that they can be immersed for cleaning purposes has not been a simple one to solve, and manufacturers have made the vessels in various ways. Some have been made as castings with the heating element embedded in the casting, usually of light metal such as aluminum. The vessels have also been drawn from sheet metal with the necessity of soldering and welding of joints to insure immersibility of the completed vessel.

It has long been appreciated that an ideal cooking vessel is one that has an interior surface which is nonporous, and which is not affected by the various foods and materials to which it is subjected during a cooking operation. Such metals as stainless steel, titanium and the like are ideal for this purpose. They do not tarnish with use, provide a surface which can be cleaned with ease regardless of the foods to which the surface is subjected during a cooking operation, and are sufficiently dense so that there are no pores or the like into which the food can enter. A cooking surface, therefore, made of stainless steel would, from that standpoint, be desirable and would eliminate the necessity of coating the cooking surface with some suitable material, as is commonly the case now.

Unfortunately, metals such as stainless steel and titanium are not good conductors of heat and, from that standpoint, are in an entirely different class from such metals as aluminum and copper, which are very good conductors of heat. If the stainless steel cooking surface could have a heating element applied thereto which was distributed over the entire surface, then the conductivity thereof would not be as important. As a practical matter, however, electrical heating elements are usually in the form of a sheathed element or a similar element which provides almost line contact with the cooking surface to be heated, and it is not practical nor economical to include a heating element in contact with the entire cooking surface to insure uniform distribution of heat. In fact, it is usual to have only a C-shaped or looped element engaging the bottom of a cooking vessel of substantial area which automatically throws out stainless steel as a satisfactory cooking surface, since to get uniform heat distribution it is necessary to rely on a heat spreading surface which will spread the heat uniformly over the entire cooking surface. It is for this reason that most of the automatic cooking vessels today are manufactured from aluminum, which provides very satisfactory heat distribution but is not the ultimate in a desirable cooking surface.

It has been suggested to manufacture cooking vessels of multilayer materials having a cooking surface defined of a more desirable material such as stainless steel or the like, and to apply to the opposite side of the cooking surface a metal of good heat conductivity in contact with the heating element which will, therefore, spread the heat uniformly to the stainless steel surface. As a matter of fact, cooking vessels have been manufactured with a stainless steel liner and an external shell of aluminum. Unfortunately, these devices have been unsatisfactory due to the fact that a poor bond was obtained between the stainless steel liner and the exterior of aluminum. Such multiwalled vessels have been cut apart and it has been found that there actually were many voids between the liner and the exterior shell. This, of course, completely defeats the purpose, since the air in the voids is a poorer conductor by far than even stainless steel, and one might better make the vessel entirely of stainless steel in the first place.

Numerous attempts have been made to produce such multiwalled vessels with various techniques. For example, attempts have been made to spray the inner surface of an aluminum cooking vessel with stainless steel. This turned out to be unsatisfactory due to the inability to develop a dense, porefree surface which permits easy cleaning and which also eliminates the possibility of bacteria growth. As a matter of fact, the Federal Food and Drug Administration has refused to approve food containers or cooking vessels where the surface contacted by the food is defined by a flame-sprayed metal. Even if there were not these drawbacks of a flame-sprayed stainless steel surface, the polishing of such a surface, once it is obtained, would be not only difficult but prohibitively expensive.

Numerous attempts to obtain a good mechanical bond between aluminum and stainless steel have been made. Various types of mechanical bonds are disclosed in a copending Jepson application Serial No. 723,877, filed March 25, 1958, now Patent No. 3,017,492, granted January 16, 1962, and assigned to the same assignee as the instant application. A mechanical bond between a stainless steel liner and an aluminum heat spreading layer has been obtained by flame spraying the side of the stainless steel liner remote from the cooking surface with aluminum. Due to the high speed with which the flame-sprayed aluminum engages the stainless steel liner, a mechanical bond is obtained between the two by virtue of a sort of erosion effect on the stainless steel. Thereafter, an aluminum exterior could be cast to the aluminum flame-sprayed coating, which cast aluminum would then incorporate the heating element therein. Such a process has been found to be very expensive and the mechanical bond is not completely satisfactory, particularly at the edges of the vessel. Numerous other attempts have also been made, such as chemically etching the stainless steel liner prior to casting an aluminum backing against the same. Some of these processes have proved to be expensive, difficult to use, and in certain cases the resultant product was not completely satisfactory. The ideal bond would, of course, be a metallurgical bond rather than a mechanical bond between the layer of material defining the cooking surface and the layer of material defining the heat spreading surface. Considerable work has been done on developing a product with a metallurgical bond between the multilayer elements, which bond is superior in strength, uniformity and heat transfer to that developed with the flame spraying techniques or other mechanical types of bonding.

Attempts have been made to bond stainless steel directly to aluminum with a so-called furnace bond. Actual metallurgical bonding was obtained by the formation of an aluminum iron alloy at the interface of the aluminum and stainless steel. However, this aluminum iron alloy was relatively thick and extremely brittle to the extent that when deformed into the shape of a cooking vessel the bonding would be destroyed. In attempting to eliminate the brittle bond between the aluminum and stainless steel, intermediate materials were employed more readily capable of forming a metallurgical bond with stainless steel and aluminum than are aluminum and stainless steel. It would be desirable to provide a multiwalled vessel with a good bond between the walls to insure uniform heating and yet provide an ideal cooking surface from the standpoint of cleaning.

Accordingly, it is an object of the present invention to provide an improved cooking vessel of the multilayer type having a metallurgical bond between the layers to insure good heat transfer.

It is another object of the present invention to provide an improved process of making a cooking vessel.

Still another object of the present invention is to provide an improved cooking vessel having a superior cooking surface which is uniformly heated by a self-contained heating element.

It is a further object of the present invention to provide a cooking vessel having an interior of one material and an exterior of a different material, and an intermediate layer metallurgically bonded to each of said two materials.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawing in which.

Briefly, the present invention is concerned with a cooking vessel having an interior of a metal such as stainless steel, titanium or the like, an exterior of a good heat conducting material such as aluminum or the like, and an intermediate layer metallurgically bonded both to the stainless steel and to the aluminum. The process, moreover, involves the manufacture of such a cooking vessel.

Figure 1:
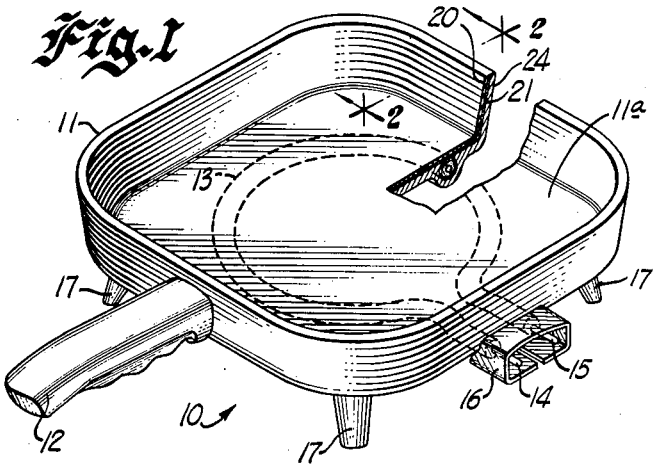
FIG. 1 is a perspective view of a cooking vessel embodying the present invention having a portion thereof cut away to illustrate the wall construction.

Referring now to FIG. 1 of the drawing, there is illustrated a cooking vessel generally indicated at 10 which may have any shape or size. By way of example, this cooking vessel has been illustrated as a frying pan of the general shape and construction of the cooking vessel shown in a copending Jepson and Wickenberg application Serial No. 739,876, filed June 4, 1958, and assigned to the same assignee as the instant application. As illustrated, it comprises a vessel portion 11 having secured thereto a handle 12. In intimate heat exchange relationship with the bottom 11a of the vessel portion 11 is a heating element 13, preferably of the well-known sheathed type. This heating element is illustrated as of somewhat C shape with the terminals 14 and 15 thereof extending into a plug receptable 16 for receiving a suitable power cord, and in the event of an automatically controlled cooking vessel a temperature control device. The vessel 11 is provided with a plurality of supporting legs 17, preferably formed of insulating material whereby the cooking vessel 10 may be placed on any surface without damage to such surface. It should be understood that the particular details of the cooking vessel 10, insofar as shape, size and the like are concerned, form no part of the present invention and are included merely by way of illustration.

There is available on the market today a multilayer sheet material comprising stainless steel and copper metallurgically bonded together. This material is available in various thicknesses. For example, there is available on the market such a compound sheet having stainless steel of a thickness of .012 of an inch metallurgically bonded to a layer of copper having a thickness of .006 of an inch. The metallurgical bond is obtained by what is commonly referred to in the trade as roll bonding. In other words, the sheets are united with heat and pressure effectively to weld uniformly the copper to the stainless steel or vice versa. The present invention contemplates using such commercially available multilayer stainless steel and copper in the formation of a cooking vessel, although it should be understood that other multilayer materials may be employed. Of course, instead of utilizing commercially available multilayer stainless steel and copper, the multilayer material can be manufactured directly by a suitable roll bonding operation.

Figure 2:
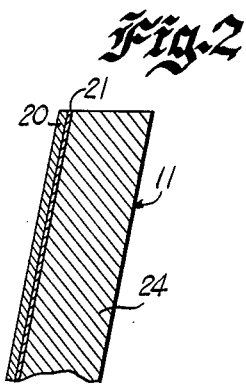
FIG. 2 is a greatly enlarged view taken on line 2—2 of FIG. 1.

In FIG. 2 of the drawing there is illustrated a section of the cooking vessel portion 11 comprising a stainless steel sheet 20 to which is metallurgically bonded a copper layer 21. The stainless steel may have a thickness of .012 of an inch, and the copper a thickness of .006 of an inch, making the laminate .018 of an inch in thickness. Obviously, various thicknesses of aluminum and copper can be employed, and the specific dimensions set forth above are by way of example only. There is also available on the market a laminate of stainless steel and copper .013 of an inch in thickness, wherein the copper thickness is .006 of an inch and the stainless steel thickness is .007 of an inch. Preferably, the stainless steel is what is referred to as Type 202, manufactured by Allegheny Ludlum Steel Corp., or the equivalent. The copper may be metallurgically bonded to the stainless steel as by being brazed with known standard brazing materials.

Figure 3:
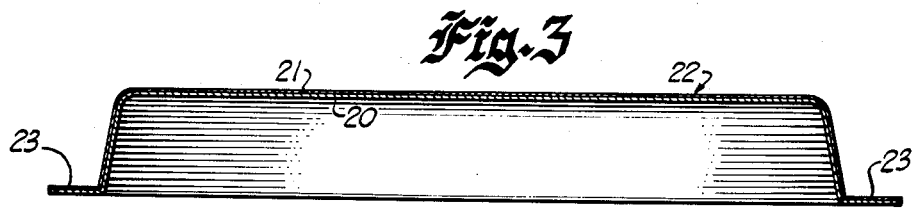
FIG. 3 is an elevational view in section illustrating one step in the process of forming a cooking vessel in accordance with the present invention.

The first step in the process of manufacturing the cooking vessel of the present invention after the laminate, including the stainless steel defining the cooking surface, is produced, is to deform the laminate into the shape of the desired cooking vessel as best shown in FIG. 3 of the drawing, where the deformed laminate is designated by the reference numeral 22. It should be noted that the interior of the deformed laminate 22 comprises the stainless steel liner 20 and the exterior comprises the copper sheet 21 metallurgically bonded to the stainless steel. Preferably, the deformed laminate 22 is provided with a peripheral flange 23 to assist in the casting or molding operation described hereinafter.

The next step in the process is to clean the copper surface 21 on the outside of the deformed laminate 22 to insure good metallurgical bonding with an aluminum layer designated by the reference numeral 24 in FIG. 2 of the drawing. This cleaning operation is for the purpose of eliminating any copper oxide, and may comprise a dipping operation in a solution of 50% nitric acid, and then in a solution of 10% hydrochloric acid. If desired, the dipping operation may be preceded by an abrading operation, particularly if the copper surface includes an excess of oxide. The copper surface is then rinsed and dried, and is ready for the casting operation.

Figure 4:
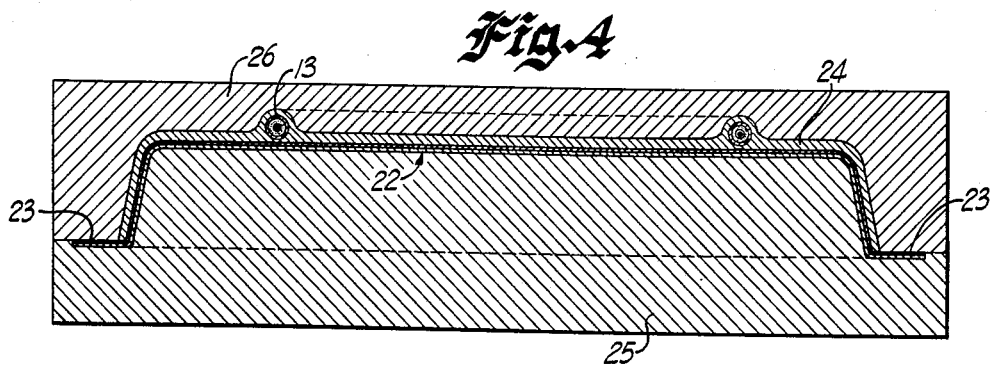
FIG. 4 is a sectional view illustrating a further step in the manufacture of a cooking vessel in accordance with the process of the present invention.
Figure 5:
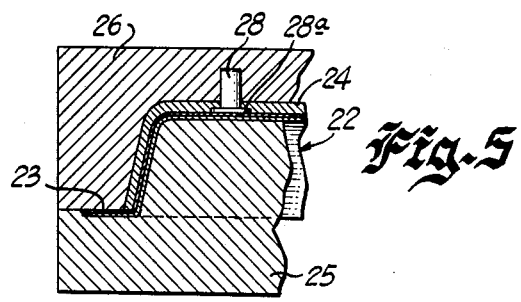
FIG. 5 is a partial sectional view similar to FIG. 4, illustrating a detail of the process.

The laminate 22 is then ready to be placed in a suitable mold, such as the one disclosed in FIG. 4 of the drawing, including a lower portion 25 and an upper portion 26. For the purpose of providing an embedded heating element, a suitable sheathed heating element 13 is then suspended in the upper portion 26 of the mold in a position spaced slightly from the laminate 22 as is brought out hereinafter. The laminate is then placed in the lower portion 25 of the mold and the mold is closed, as illustrated in FIG. 4 of the drawing. The peripheral flange 23 of the laminate is located within a suitable cavity defined in the lower portion 25 of the mold. The peripheral flange 23 may include suitable means properly to locate the same relative to the mold section 25. By virtue of the peripheral flange 23 and the cavity in the mold section 25 therefor, a seal is insured to prevent molten aluminum from getting on the underside of the stainless steel portion 20 of the laminate 22. The mold cavity will be such as to provide the desired thickness of the cast aluminum 24 and to insure complete embedding of the heating element 13, as is clearly shown in FIG. 4 of the drawing. In an embodiment built in accordance with the present invention, the aluminum 24 had a thickness of the order of an eighth of an inch but, obviously, this could vary widely. Molten aluminum is then supplied to the mold through a suitable opening not shown. It will be understood that copper is soluble in aluminum and, hence, a good metallurgical bond is obtained.

In accordance with the present invention, if gravity casting is employed, the laminate is inserted into the mold as soon as possible after the cleaning thereof as described above, and the casting operation is performed without delay to minimize the formation of copper oxide on the copper surface 21. It will be appreciated that such oxide would inhibit bonding. The aluminum is supplied to the mold at a temperature of between 1200° and 1500° F., with an optimum temperature of between 1300° and 1400° F. Upon removal from the mold of the laminate 22 with the aluminum cast thereon, the peripheral flange 23 is cut off and the edge polished to provide the desired smoothness. A commercially available aluminum Alloy 13 is well suited for this gravity casting operation. Obviously, other known aluminum alloys are suitable for this operation.

If instead of gravity casting a die casting process is employed, after the cleaning steps the laminate is inserted without delay into the die, and the molten aluminum is again supplied without delay. This is to prevent the formation of any appreciable amount of copper oxides on the surface 21 of the laminate, which might be detrimental to the bonding operation. The die during this operation is customarily at a temperature of from 500° F. to 650° F., and when the laminate at room temperature is placed into the die, it is rapidly heated by the die. Hence, the casting step must be effected immediately to prevent oxidation of the surface 21 before the molten aluminum is applied thereto. Moreover, the optimum temperature of the aluminum during the die casting operation is between 1150° F. and 1400° F. Standard commercial die casting pressures of between 3,000 lbs. and 30,000 lbs. per square inch are employed. Any suitable commercially available aluminum may be employed for the casting operation, but preferably aluminum Alloy 360 is employed because of its very high thermal conductivity and its melting range. This alloy comprises the following:

| | |
|---|---|
| Cu | maximum .6% |
| Fe | do .8% |
| Si | 9% to 10% |
| Mn | maximum .3% |
| Zn | do .5% |
| Ni | do .5% |
| Sn | do .1% |
| Mg | .4% to .6% |
| All others, exclusive of Al | maximum .2% |
| Al | Balance |

For the purpose of securing the legs 17 to the vessel 11, the cast portion of the aluminum may be drilled and tapped for suitable fastening means. Preferably, although not shown in FIG. 4 of the drawing, and to provide leg supports, the mold will include spaced recesses to define integral projections of the aluminum material after the casting operation is completed. If desired, suitable tapped inserts such as 28 may be positioned on the laminate prior to the casting operation. These inserts 28 may have an enlarged head such as 28a so that they will be firmly secured to the finished vessel after the casting operation, and it will readily be appreciated that the legs can then be secured to the tapped inserts 28. Just how the legs are secured to the vessel is not important as far as the present invention is concerned.

In casting the aluminum on the laminate 22, the molten aluminum melts and dissolves the portion of the copper layer 21 adjacent thereto, but the thermal conditions of casting are kept such that the layer 21 is not melted completely through, and the bond between the layer 21 and the stainless steel sheet 20 is not melted or otherwise affected. These conditions are obtained by the above temperatures of casting which are maintained only so long as is necessary to fill the die with molten metal, and then the die with its contents is immediately cooled. In this manner, the aluminum and the copper form a strong, uniform metallurgical bond therebetween, and the aluminum is not in contact with the stainless steel or the metallurgical bond between the stainless steel and copper.

It should be understood that although the laminate produced by the present invention has been specifically described as one of a stainless steel interior, a cast aluminum exterior, and an interposed layer of copper, other metals might also be employed. For example, titanium would produce a very desirable cooking surface and, although too expensive at the present time, it may well be substantially reduced in cost as time progresses. Also, instead of an intermediate layer of copper, an intermediate layer of aluminum or some other material may be used.

In view of the detailed description included above, the process of the present invention and the operation of the improved cooking vessel obtained thereby will readily be understood by those skilled in the art and no further discussion is included herewith.

While there has been illustrated and described an improved cooking vessel of the present invention and an improved process for making the same, it will be understood by those skilled in the art that numerous changes and modifications are possible and are likely to occur to those skilled in the art. It is intended in the appended claims to cover all those changes and modifications that fall within the true spirit and scope of the present invention.

What is claimed as new and desired to be secured by Letters Patent of the United States is:

1. The process of making a cooking vessel having a stainless steel interior and an aluminum exterior which comprises metallurgically bonding a thin sheet of copper to a thin sheet of stainless steel to produce a composite sheet, deforming said composite sheet into the shape of a cooking vessel, placing said deformed composite sheet into a mold, and casting an aluminum layer over the copper surface of said composite sheet, said aluminum forming exclusively a metallurgical bond with said copper.

2. The process of manufacturing a cooking vessel having an interior of a relatively hard material which is a relatively poor conductor of heat and an exterior from a material which is an excellent heat conductor but which cannot be readily metallurgically bonded to said relatively hard material, which comprises metallurgically bonding a thin sheet of a third material to a thin sheet of said relatively hard material to form a composite sheet, deforming said composite sheet into the shape of a cooking vessel with said relatively hard material defining the interior of said vessel, placing said deformed composite sheet in a mold and casting a layer of said material which is an excellent heat conductor over the surface of said third material, said third material and said layer of material which is an excellent heat conductor being exclusively metallurgically bonded together.

3. A cooking vessel comprising a cooking surface or interior layer in sheet form of a relatively hard material which is a relatively poor heat conductor, an exterior layer of a material which is an excellent heat conductor but which cannot readily be metallurgically bonded to said hard material, and an intermediate layer disposed between said two materials of a third material, said third material being in sheet form and forming exclusively a metallurgical bond with each of said other two materials.

4. The process of making a cooking vessel having a stainless steel interior and an aluminum exterior which comprises metallurgically bonding a thin sheet of copper to a thin sheet of stainless steel to produce a composite sheet, deforming said composite sheet into the shape of a cooking vessel, locating an electrical heating element and said composite sheet in a mold in close proximity to one another, and casting an aluminum layer over the copper surface of said composite sheet and said heating element, said aluminum forming exclusively a metallurgical bond with said copper.

5. A cooking vessel comprising an interior layer of stainless steel in sheet form defining the cooking surface, an exterior layer of cast aluminum and an intermediate layer of copper in sheet form, said copper layer having one side exclusively metallurgically bonded to said stainless steel layer, the other side being exclusively metallurgically bonded to said aluminum layer, and a heating element embedded in said layer of aluminum.

6. The cooking vessel of claim 5 wherein said stainless steel is of the order of twelve thousandths of an inch in thickness, said copper is of the order of six thousandths of an inch in thickness, and said aluminum layer is of the order of an eighth of an inch in thickness.

References Cited in the file of this patent

UNITED STATES PATENTS

| | | |
|---|---|---|
| 1,180,248 | Lapotterie | Apr. 18, 1916 |
| 1,359,719 | Mead | Nov. 23, 1920 |
| 2,490,543 | Robertson et al. | Dec. 6, 1949 |
| 2,490,549 | Schultz et al. | Dec. 6, 1949 |
| 2,539,246 | Hensel | Jan. 23, 1951 |
| 2,604,227 | Carriker | July 22, 1952 |
| 2,735,170 | Moffat | Feb. 21, 1956 |
| 2,744,995 | Jepson | May 8, 1956 |
| 2,807,435 | Howlett et al. | Sept. 24, 1957 |

FOREIGN PATENTS

| | | |
|---|---|---|
| 203,576 | Australia | Sept. 10, 1956 |
| 203,775 | Australia | Oct. 16, 1956 |
| 733,981 | Great Britain | July 20, 1955 |